United States Patent [19]

Onoda et al.

[11] Patent Number: 4,532,521

[45] Date of Patent: Jul. 30, 1985

[54] RECORDING APPARATUS

[75] Inventors: Hiroshi Onoda; Kenji Mizuno, both of Nagoya, Japan

[73] Assignee: Brother Kogyo Kabushiki Kaisha, Nagoya, Japan

[21] Appl. No.: 586,324

[22] Filed: Mar. 5, 1984

[30] Foreign Application Priority Data

Mar. 18, 1983 [JP] Japan ................................. 58-46570
Nov. 30, 1983 [JP] Japan ............................... 58-226482

[51] Int. Cl.³ ............................................. G01D 9/38
[52] U.S. Cl. .............................. 346/33 R; 346/139 R; 346/136; 364/520; 400/17; 400/18; 400/118
[58] Field of Search ................ 346/139 R, 136, 33 R; 400/118, 16, 17, 18, 21; 364/518, 520; 33/18 R

[56] References Cited

U.S. PATENT DOCUMENTS 3,702,922  11/1972  Hall ..................................... 364/520
4,150,902   4/1979  Brescia ................................ 400/17
4,441,109   4/1984  Fujisawa ......................... 346/139 R
4,467,525   8/1984  Logan ................................ 33/18 B

OTHER PUBLICATIONS

Fisher, Byron; The 4662-A New Concept: Interactive Digital Plotting, Tekscope, vol. 8, No. 3, 1976, pp. 2–7.

*Primary Examiner*—Joseph W. Hartary
*Attorney, Agent, or Firm*—Moonray Kojima

[57] ABSTRACT

A recording apparatus comprising a paper feed device for feeding a recording paper in forward and reverse directions; a carriage for supporting a writing tool and being movable perpendicularly to the feed direction of the paper; a carriage drive device for driving the carriage; a writing tool drive device for driving the writing tool towards the recording paper; a character pattern generator for generating character patterns; a control device for reading out corresponding character pattern data on basis of record data and driving the carriage drive device and the writing tool drive device to control the paper feed device, in response to the character pattern data; change means for changing lateral and longitudinal directions of recording; and means for mutually changing drive signals to be supplied from the control device to the paper feed device and the carriage drive device, respectively, on the basis of the change means, whereby direction of recording can be simply and readily changed.

7 Claims, 14 Drawing Figures

FIG.9(A)
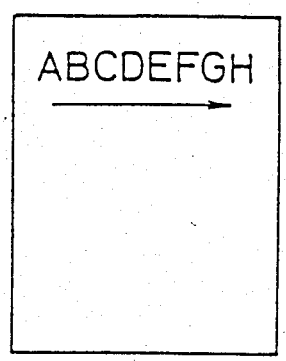
FIG.9(B)
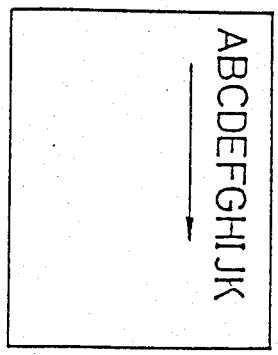
FIG.9(C)
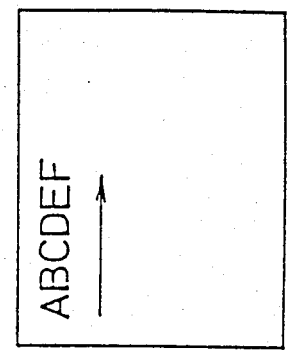
FIG.4(A)
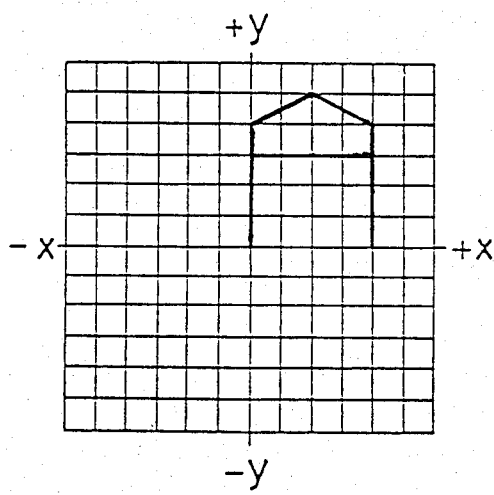
FIG.4(B)
| ST-EP | X DATA * | | | ** | | Y DATA * | | | ** | |
|---|---|---|---|---|---|---|---|---|---|---|
| 1 | X | 0 | 0 | 0 | | 1 | 1 | 0 | 0 | |
| 2 | 1 | 0 | 1 | 0 | | 1 | 0 | 1 | 0 | |
| 3 | 1 | 0 | 1 | 0 | | 0 | 0 | 1 | 0 | |
| 4 | X | 0 | 0 | 0 | | 0 | 1 | 0 | 0 | |
| 5 | X | 0 | 0 | 0 | | 1 | 0 | 1 | 1 | |
| 6 | 0 | 1 | 0 | 0 | | X | 0 | 0 | 0 | |
| PEN UP | X | 0 | 0 | 0 | | X | 0 | 0 | 0 | |
| 7 | 1 | 0 | 1 | 1 | | 0 | 0 | 1 | 1 | |
| 8 | 1 | 0 | 1 | 1 | | X | 0 | 0 | 0 | |
NOTE: * DIRECTION
** QUANTITY OF MOVEMENT

FIG.5(A)
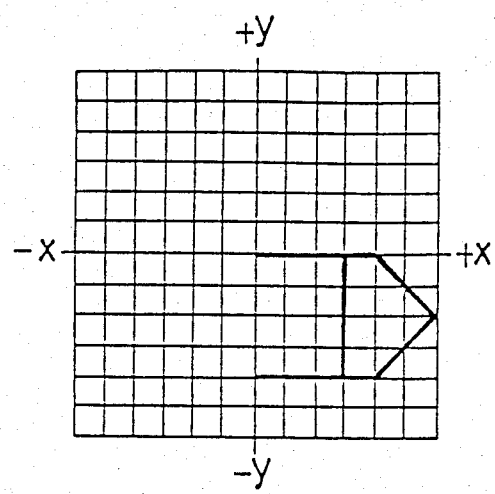
FIG.5(B)
| ST-EP | X DATA | | | | Y DATA | | | |
|---|---|---|---|---|---|---|---|---|
| | * | ** | | | * | ** | | |
| 1 | 1 | 1 | 0 | 0 | X | 0 | 0 | 0 |
| 2 | 1 | 0 | 1 | 0 | 0 | 0 | 1 | 0 |
| 3 | 0 | 0 | 1 | 0 | 0 | 0 | 1 | 0 |
| 4 | 0 | 1 | 0 | 0 | X | 0 | 0 | 0 |
| 5 | 1 | 0 | 1 | 1 | X | 0 | 0 | 0 |
| 6 | X | 0 | 0 | 0 | 1 | 1 | 0 | 0 |
| PEN UP | X | 0 | 0 | 0 | X | 0 | 0 | 0 |
| 7 | 0 | 0 | 1 | 1 | 0 | 0 | 1 | 1 |
| 8 | X | 0 | 0 | 0 | 0 | 0 | 1 | 1 |
NOTE: * DIRECTION
      ** QUANTITY OF MOVEMENT
FIG.6(A)
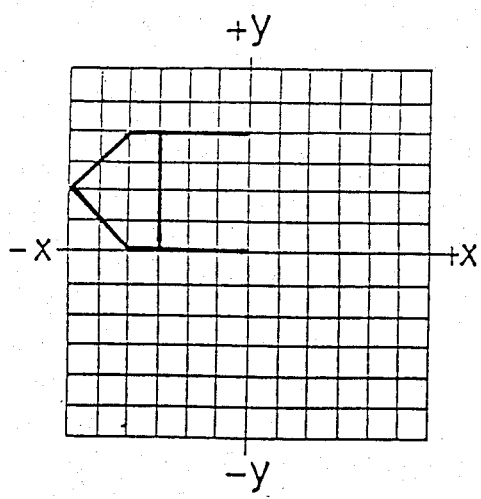
FIG.6(B)
| ST-EP | X DATA | | | | Y DATA | | | |
|---|---|---|---|---|---|---|---|---|
| | * | ** | | | * | ** | | |
| 1 | 0 | 1 | 0 | 0 | X | 0 | 0 | 0 |
| 2 | 0 | 0 | 1 | 0 | 1 | 0 | 1 | 0 |
| 3 | 1 | 0 | 1 | 0 | 1 | 0 | 1 | 0 |
| 4 | 1 | 1 | 0 | 0 | X | 0 | 0 | 0 |
| 5 | 0 | 0 | 1 | 1 | X | 0 | 0 | 0 |
| 6 | X | 0 | 0 | 0 | 0 | 1 | 0 | 0 |
| PEN UP | X | 0 | 0 | 0 | X | 0 | 0 | 0 |
| 7 | 1 | 0 | 1 | 1 | 1 | 0 | 1 | 1 |
| 8 | X | 0 | 0 | 0 | 1 | 0 | 1 | 1 |
NOTE: * DIRECTION
      ** QUANTITY OF MOVEMENT

RECORDING APPARATUS

BACKGROUND OF THE INVENTION

1. Field of the Invention

This invention relates to a recording apparatus, having, for example, a keyboard, and more particularly to such an apparatus wherein the direction of recording can be simply and readily changed.

2. Discussion of the Prior Art

In the prior art, in order to change the direction of recording, such as from one to another of lateral and/or longitudinal directions of recording, a serial printer was proposed to record characters as dot matrix characters. Such a serial printer is provided with a memory for storing the printing data corresponding to one page of the recording paper. Printing data from an external device is stored as a character code in a state of printing format in the memory. At a print start command in, for example, a longitudinal direction of recording, regarding the character code stored in the memory, a character code in a top digit of each character row is read in the longitudinal direction from the last row in sequence, and then dot pattern data corresponding to the read character code, are read out from a character pattern generator converting longitudinal and lateral directions, and then outputted to a printer.

Such a conventional apparatus has many disadvantages, such as the requirement of a sufficiently large memory corresponding to one page, which results in high cost. Moreover, since dot pattern data are read out from the character pattern generator in converting longitudinal and lateral directions, the printing time is lengthened. Furthermore, the printing cannot be performed before data corresponding to one page is stored in the memory, thereby making it impossible for recording or printing data inputted from a keyboard to be printed for each character as in the case of the ordinary typewriter. Also, when characters, symbols and the like are to be recorded on a recording paper, particularly when additional writing is to be inserted along ordinates and abscissas of a graph, it is frequently required that characters be arranged perpendicularly to normal character recording direction which is parallel to the carriage moving direction.

Thus, in the art, there remains a need for a recording or printing apparatus wherein the direction of recording or printing, such as parallel and/or perpendicular to the carriage moving direction, can be readily and simply changed.

SUMMARY OF THE INVENTION

Accordingly, an object of the invention is to overcome the aforementioned and other deficiencies and disadvantages of the prior art.

Another object is to provide a recording apparatus wherein the direction of recording of characters, symbols and the like to be recorded on a printing or recording paper, can be easily changed.

A further object is to provide a recording apparatus having a keyboard, wherein the direction of recording of characters, symbols and the like, to be recorded or printed on a paper can be easily changed.

The foregoing and other objects and features are attained by the invention which encompasses a recording apparatus comprising a paper feed device for feeding a recording paper, supported on a paper support device, in forward and reverse directions; a carriage for supporting a writing tool and being movable perpendicularly to the feed direction of the recording paper; a carriage drive device for driving the carriage; a writing tool drive device for driving the writing tool towards the recording paper; a character pattern generator for generating character pattern data; a control device for reading out the corresponding character pattern data on basis of recording data and for controlling the paper feed device, the carriage drive device and the writing tool drive device, in response to the character pattern data; change means for changing the direction of recording; and means for mutually changing the drive signals to be supplied from the control device to the paper feed device and the carriage drive device, respectively, on basis of operation of the change means.

In another embodiment, the recording apparatus has a keyboard and a plurality of function keys, and comprises a paper feed device for feeding a recording paper, supported on a paper support device, in forward and reverse directions; a carriage for supporting a writing tool and being movable perpendicularly to the feed direction of the recording paper; a carriage drive device for driving the carriage; a writing tool drive device for contacting the writing tool to the recording paper; a character pattern memory for storing character pattern data; a control device for reading out the corresponding character pattern on basis of operation of character and symbol keys, and for controlling the paper feed device, the carriage device and the writing tool drive device in response to the character pattern data; and change means for mutually changing the drive signals to be supplied from the control device to the paper feed device and to the carriage drive device, respectively, wherein the keyboard has special keys for commanding whether a character or a symbol is recorded in longitudinal recording direction or lateral direction with respect to the recording paper, so that data inputted from the keyboard is recorded in the direction corresponding to the selected special key.

Thus, advantageously, the direction of recording of characters, symbols, and the like is readily changed using the invention.

BRIEF DESCRIPTION OF THE DRAWING

FIG.4(A) is a diagram depicting a character pattern drawn by use of character pattern data read from the character generator of FIG. 3.

FIG. 4(B) is a diagram depicting character pattern data for the character pattern of FIG. 4(A).

FIGS. 5(A), 5(B) and 6(A), 6(B) are similar to FIGS. 4(A) and 4(B), and depict character patterns as recorded and data for forming such character pattern to different directions of recording, with the FIGS. 4(A) and 4(B) being recording in the normal direction.

FIGS. 9(A), 9(B) and 9(C) depict a line of characters as drawn in different directions, when the vector key is operated for the respective directions.

DETAILED DESCRIPTION OF PREFERRED EMBODIMENTS

Figure 1:
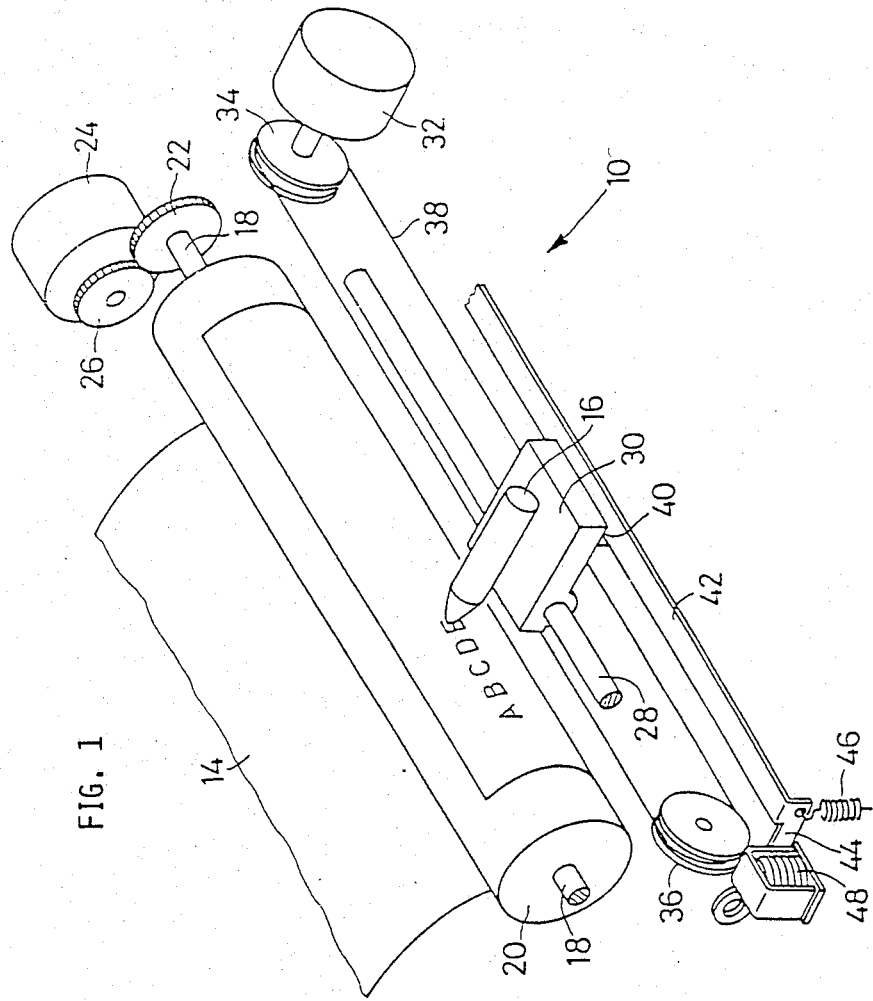
FIG. 1 is a perspective view depicting an illustrative embodiment of the invention.
Figure 2:
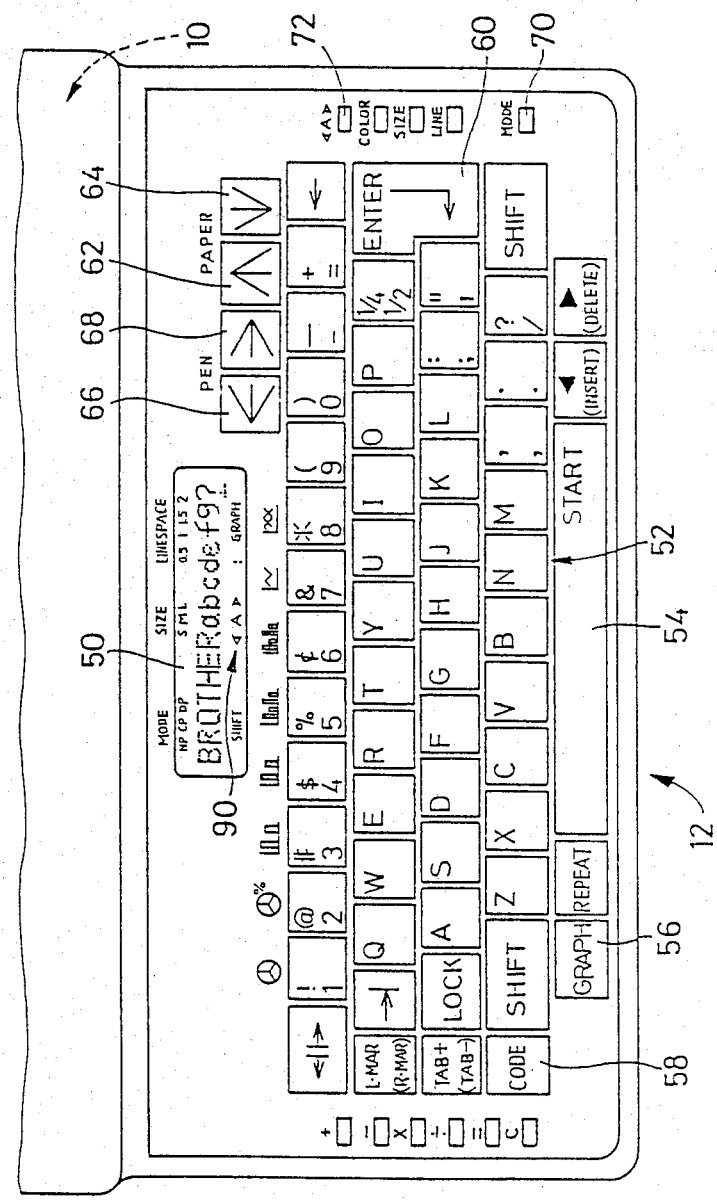
FIG. 2 is a top plan view of an illustrative keyboard which may be used with the embodiment of FIG. 1.

FIGS. 1 and 2 depict a recording device 10 and a keyboard 2, respectively, and which may be used together. Recording device 10 is arranged to be disposed behind keyboard 12 and both are arranged in a machine frame (not shown).

In recording device 10, a ball-point pen 16, as an example of a writing tool, is contacted to a recording paper 14 and both are moved in relative motion whereby character, symbol, figure, graph, picture or the like, is written on recording paper 14. That is, a horizontal platen shaft 18 is rotatably supported by a bearing (not shown), and a platen 20 with circular cross-section is fixed in coaxial relation to platen shaft 18. A platen gear 22 is fixed to one end of platen shaft 18 and meshed with a motor gear 26 fixed to an output shaft of paper-feeding stepping motor 24. When platen 20 is driven for rotation by the stepping motor 24, recording paper 14 which is wound about and held to platen 20, is fed longitudinally in the vertical direction (as viewed in FIG. 1) Platen 20, gears 22, and stepping motor 24 may be considered to constitute a paper feed device.

On a front side of platen 20, a guide rod 28, with circular cross section, is fixed in parallel to rotation center axis of platen 20, onto a machine frame (not shown). A carriage 30, having ball point pen 16 affixed thereon, is supported by guide rod 28 so that carriage 30 is movable in an axial direction and rotatable thereabout. A wire 38 is stretched between a driving pulley 34, fixed to an output shaft of stepping motor 32, and a driven pulley 36 and is disposed in parallel to guide rod 28. Carriage 30 is fixed to wire 38 so that it is driven perpendicularly to the feed direction of recording paper 14. Wire 38, guide rod 28, driving pulley 34, driven pulley 36 and stepping motor 32 may be considered to constitute a carriage drive device.

A front end 40 of carriage 30 is slidably held to a guide plate 42, which is disposed at the front side of guide rod 28 and in parallel thereto. A position of carriage 30 around guide rod 28 is varied depending on the vertical motion of guide plate 42. Guide plate 42 is provided with a pair of arms 44 pivotally mounted to the machine frame (not shown). A return spring 46 is stretched between arm 44 and machine frame (not shown) so that guide plate 42 is normally biased downwards. Arm 44 is connected to a solenoid 48 in a manner for driving arm 44 is a direction against the biasing force of spring 46. Consequently, front end 40 of carriage 30 is normally disposed in a downward position and the top end of ball point pen 16 is separated from recording paper 14. When solenoid 48 is operated and arm 44 is driven upward against the resilient force of spring 46, ball point pen 16 is urged onto recording paper 14. Guide plate 42, arm 44 and solenoid 48 may be considered to constitute a writing tool drive device.

Keyboard 12 is provided with a liquid crystal display 50 and has a number of input keys. The input keys comprise character keys 52 having alphanumeric characters marked thereon, a space key 54, a graph key 56, a code key 58, a carriage return key 60, paper feed keys 62,64, pen moving keys 66,68, a mode key 70, a vector key 72 as a special key. Other keys may be used.

Figure 3:
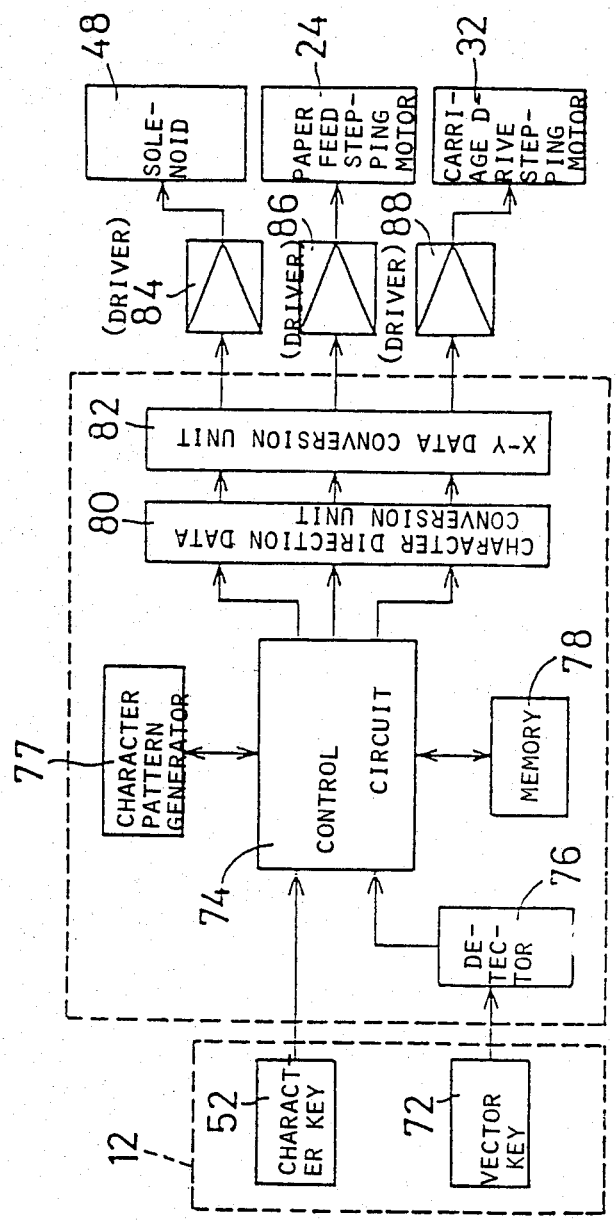
FIG. 3 is a block diagram of circuit components used in the illustrative embodiment.

The recording apparatus comprising keyboard 12 and recording device 10, has a circuit shown, for example, in FIG. 3, which comprises a control circuit 74, which acts as a control device and is supplied with an operation signal which corresponds to a character, symbol or the like, from character keys 52 in keyboard 12 and also an operation signal from vector key 72 through a detector 76. Control circuit 74 reads out character pattern data for display recording of the character corresponding to the operation signal from character keys 52 according to a program stored in a memory 78 with a character pattern generator 77 which acts as a character pattern memory, and supplies the character pattern data to a character direction data conversion unit 80 and X-Y data conversion unit 82.

As will be discussed, advantageously, the embodiment just described can readily record one or more characters, symbols, etc, sequentially, for example, in a normal left to right (or right to left) direction parallel to the carriage movement, as shown in FIG. 9(A); or in an up to down direction perpendicular to the carriage movement, as shown in FIG. 9(B); or in a down to up direction perpendicular to the carriage movement, as shown in FIG. 9(C).

For example, when character "A", in the normal direction of arrangement, is inputted, character pattern data is specified to write the character pattern shown in FIG. 4(A), and is instructed by data in a series of steps shown in FIG. 4(B). Each data comprises X-data and Y-data of four bits. The most significant bit (MSB) of X-data and Y-data represent the moving direction and the remaining lower three bits represent the amount of movement (see FIG. 4(B)). When the most significant bit is "1", it represents a positive direction in FIG. 4(A). When the most significant bit is "0", it represents a negative direction in FIG. 4(A).

When vector key 72 is operated, control circuit 74 commands the exchange or conversion of the most significant bit and the lower three bits to the character direction data conversion unit 80 and the X-Y data conversion unit 82.

When the arrangement of character pattern in the character arranging direction shown in FIG. 5(A), i.e. downward direction, is selected by operation of vector key 72, the four bits which constitute the X-data and Y-data in FIG. 4(B) are completely exchanged, as shown in FIG. 5(B). "1" and "0" in the most significant bits of Y-data are converted reversely and outputted.

On the other hand, when the arrangement of character pattern in the character arranging direction shown in FIG. 6(A), i.e. upward direction, is selected by operation of vector key 72, four bits of X-data and Y-data shown in FIG. 4(B) are completely exchanged, as shown in FIG. 6(B). "1" and "0" in the most significant bits of X-data are converted reversely and outputted.

Character direction conversion unit 80 and X-Y data conversion unit 82 may be considered to constitute means for changing data so as to convert the character arranging direction. The most significant bit of "X" means that the most significant bit may be skipped when any of the lower three bits is "0".

Data converted as above described are made as drive signals and supplied through drivers 86,88 to paper feeding stepping motor 24 and carriage driving motor 32, respectively. Drive signals for driving solenoid 48 are supplied through driver 84 to solenoid 48. Working of stepping motors 24,32 including character keys 52 and space key 54 and operating function keys, such as margin set key, tab set key, back space key, forward line feed key, reverse line feed key, return key, etc, is shown in Table 1, hereinbelow.

Figure 7:
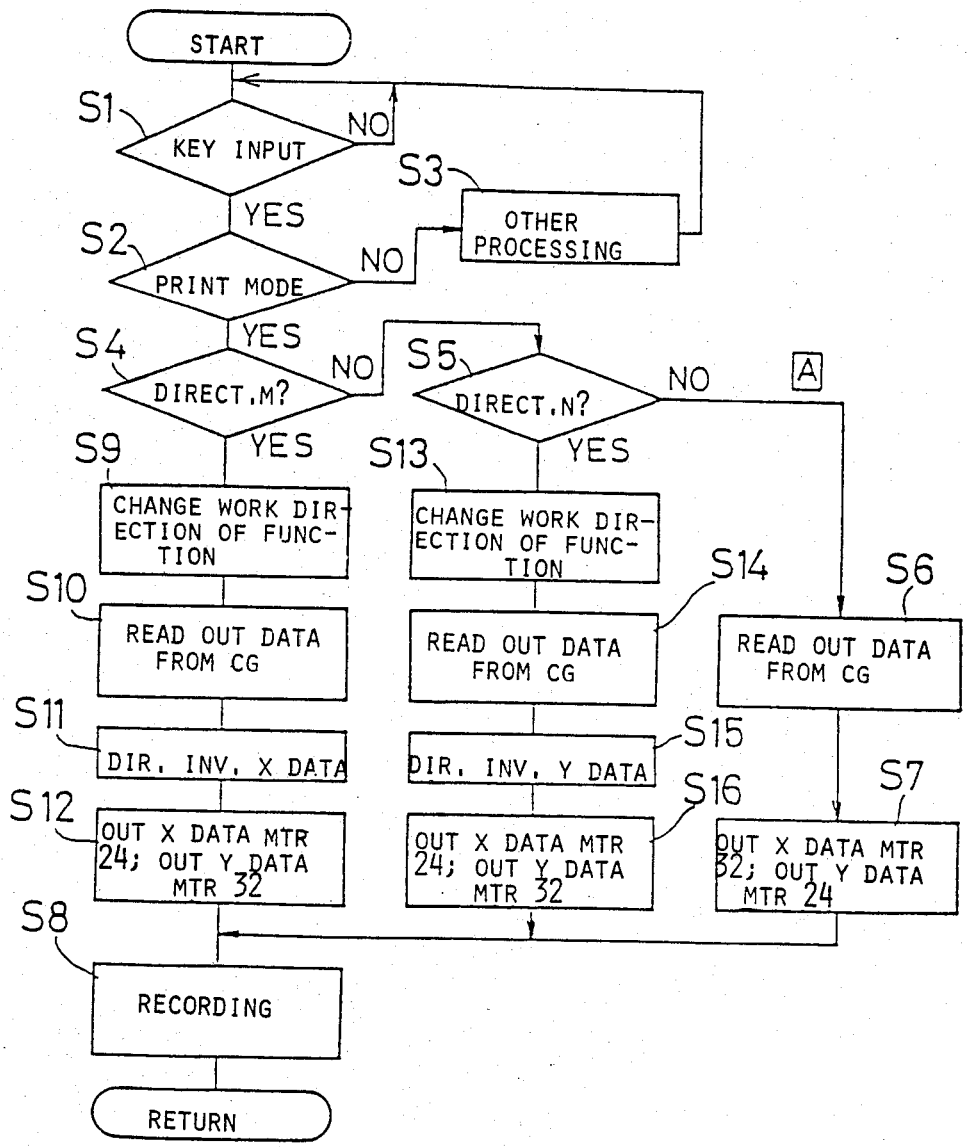
FIG. 7 is a flow chart depicting operation of the embodiment of FIGS. 1 and 2.

Operation of the illustrative embodiment will now be described with reference to flow chart of FIG. 7. First step S1 is executed and it is determined whether or not any of keys of keyboard 12 is not operated, execution of step S1 is repeated. If keyboard 12 is operated, next, step S2 is executed and it is determined whether or not a print mode exists. In the illustrative embodiment, at every operation of mode key 70, the print mode is selected alternatively to any of three modes, non-print (NP), collection print (CP) and direct print (DP), in sequence. If the collection print or direct print is selected, it is determined that a print mode exists.

Figure 8:
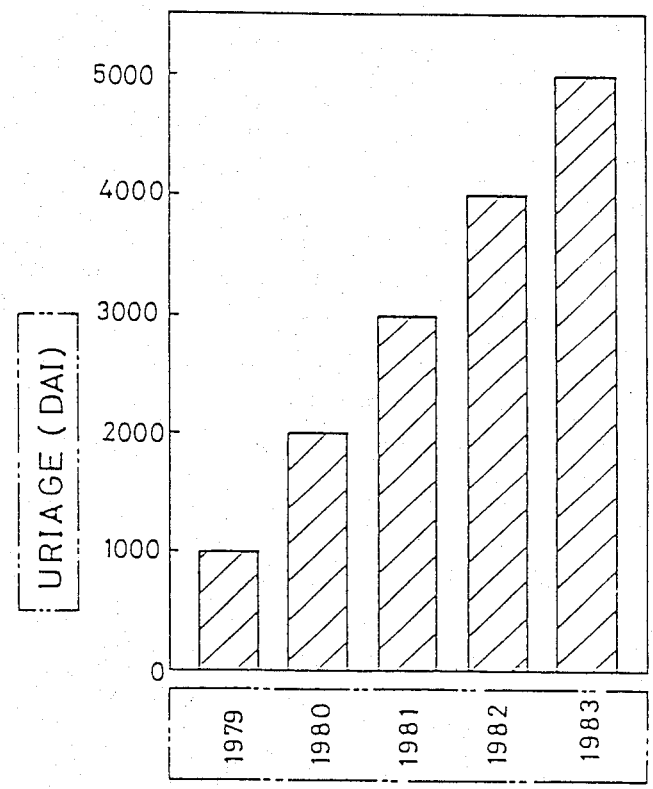
FIG. 8 is a diagram illustrating an example of a graph and additional characters drawn by the illustrative embodiment of FIGS. 1 and 2.

If the decision at step S2 is determined to be not a print mode, other processing in step S3 is executed. Other processing may be, for example, graph mode processing, in which case, a bar graph such as shown in FIG. 8 or otherwise a line graph or a pice chart may be drawn and recorded. Drawing of such graphs is made in the graph mode by operating graph key 56 (in FIG. 2). When graph selection message is displayed on liquid crystal indicator 50, any of character keys 52 with numeric characters 1 through 8 marked thereon is operated thereby and any of eight different graphs is selected. Every time the numeric character for the graph display desired, is inputted by operating character keys 52 with numeric characters marked thereon, the carriage return key (enter key) 60 is operated and then the space key (start key) 54 is started.

If the determination at step S2 is to be the print mode, steps S4 and S5 are executed and it is determined which of character arranging directions on the recording paper 14 is to be executed by operating vector key 72.

If a normal arranging direction (ie the normal direction of recording) which is parallel to the moving direction of the carriage 30, is selected, characters representing the normal "A" of index 90 on liquid crystal indicator 50 is displayed and in this case, the determination is "NO" is effected in both steps S4 and S5 (that is the recording direction of A is not in an "M" direction or in an "N" direction, the letters "M" and "N" having been assigned arbitrarily to indicate direction of recording), and step S6 is executed.

In step S6, for example, if the character key 52 with "A" marked thereon is operated, data shown in FIG. 4(B) is read out from character pattern generator 77 (of FIG. 3). Then, step S7 is executed and X-data of the written data is supplied through driver 88 to carriage stepping motor 32. Y-data is supplied through driver 86 to paper feed stepping motor 24. Step S8 is executed, and on the basis of supplied data, ball point pen 16 and recording paper 14 are moved in relative motion, and the characters are arranged and recorded in the normal direction, such as shown in FIG. 9(A), in sequence corresponding to the input of the character keys 52.

When the symbol "A" turned sideways with the top pointing to the right on this sheet, is desired to be printed, in the state (called direction "M" in FIG. 7) is displayed in index 90 by suitably operating vector key 72 and a downward arranging direction is selected. In this state in step S4 of FIG. 7, the determination of whether the recording direction is in the "M" direction is "YES", and then step S9 is executed. The working direction of both motors 24,32 is exchanged, as shown in the right hand column of TABLE 1, hereinbelow, for the case of operating functional keys such as tab key, margin key, or the like. Step S10 is also executed, for example, and data shown in FIG. 4(B) is taken from the character generator 77 in a similar manner to step S6. Then, step S11 is executed and "1" and "0" of the most significant bits in the X-data are converted.

Step S12 is then executed, and the entire data of X-data read out from the control circuit are supplied through driver 86 to stepping motor 24 for the paper feed direction (Y direction). Also, the entire data of Y-data are supplied through driver 88 to stepping motor 32 for carriage moving direction (X direction). If step S8 is executed and on the basis of supplied data, ball point pen 16 and recording paper 16 are moved in relative motion, every input operation of key 52, in the direction shown in FIG. 9(B), for example, produces characters which are arranged and recorded in sequence. In this case, prior to the arranging direction conversion operation by vector key 72 or subsequent operation of character keys 52, it is possible to locate the relative motion of the ball point pen 16 against the recording paper 14 to the most favorable position upon operation of the paper feed keys 62,64 and the pen moving keys 66,68. Just as readily, at the same time of operation of vector key 72, ball point pen 16 may be automatically moved to a predetermined relative position against the recording paper 14.

When the symbol "A" turned sideways with the top pointed toward the left of this sheet, is desired to be in the state (called direction N in FIG. 7) brought down leftwards by 90 degrees from the normal state, it is displayed in index 90 by operating vector key 72 and an upward arranging direction is selected. In this state, in step S4 direction "M" is determined to be "NO", and in Step S5, the direction "N" is determined to be "YES". Then, step S13 and later steps are executed. In steps S13 and S14, similar processing to steps S9 and S10 are carried out, and operation is exchanged into the working direction of motors 24 and 32, shown in the right hand column of Table 1, and character pattern data representing characters corresponding to character keys 52 are read out from character generator 77. Step S15 is executed and the most significant bit of Y-data read out are exchanged from "1" to "0" and from "0" to "1". Then, Step S16 is executed, and in a manner similar to step S12, entire data of X-data are supplied through driver 86 to paper feed stepping motor 24, and the entire data of Y-data are supplied through driver 88 to carriage stepping motor 32. As a result, when character key 52 representing "a" for example, is operated, data shown in FIG. 6(B) are outputted as drive signals from X-Y data conversion unit 82. Step S8 is executed in a similar manner to the above described, and characters corresponding to operation of the character keys 52 are arranged and recorded in sequence in the direction shown in FIG. 9(C).

When the bar graph of FIG. 8, for example, is already drawn, the recording start position is selectively located by the operation of the paper feed keys 62,64 and pen moving keys 66,68, whereby the additional characters enclosed by the dash and dot lines in FIG. 8, may be written in parallel to the paper feed direction (that is longitudinal direction).

According to the illustrative embodiment, the arranging direction of characters, symbols and the like, is readily converted by right angles upward or downward, with respect to the usual arranging direction by operating vector key 72. Thus, the function of the recording apparatus having a ball point pen, as a writing tool as an example, is suitably improved. Particularly, in order to insert additional characters in a graph as shown in FIG. 8, characters may be arranged in an upward or downward direction, whereby space on the graph including the additional characters, may be saved, and furthermore, additional characters in series may be arranged and recorded in the longitudinal direction so as to enable the additional characters to be read easily.

Although in the illustrative embodiment vector key 72 is composed of push buttons of automatic reset type, and at every pushing operation, the character arranging directions may be selected in sequence, a changeover switch may be used where any one position of the illustrated three positions representing different recording directions is selectively operated. The moving mechanical parts are movable in different directions. All of the motors are rotatable in forward and reverse directions.

TABLE 1

| Key | Lateral Record | Longitudinal Record |
|---|---|---|
| Character Input | Motor 24: Constituted in 6 steps Motor 32: Constituted in 4 steps After printing, motor 32 only advances 6 steps in comparison to state before printing | Motor 32: Constituted in 6 steps Motor 24: Constituted in 4 steps After printing, motor 24, only advances 6 steps in comparison to state before printing |
| Space | motor 32 advances 6 steps | motor 32 advances 6 steps |
| Margin Set | Store motor 32 position | Store motor 24 position |
| Tab Set | Store motor 32 position | Store motor 24 position |
| Tab | Motor 32 rotates in prescribed steps | Motor 24 rotates in prescribed steps. |
| Back space | Motor 32 returns 6 steps | Motor returns 6 steps |
| Forward line feed | Motor 24 advances 10 steps | Motor 32 advances 10 steps |
| Reverse line feed | Motor 24 returns 10 steps | Motor 32 returns 10 steps. |
| Return | Motor 24 advances 10 steps Motor 32 rotates to left margin set. | Motor 32 advances 10 steps Motor 24 rotates to upper set. |

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A recording apparatus with a keyboard, comprising
   a paper feed device for feeding a recording paper, supported on a paper support device, in forward and reverse directions;
   a carriage for supporting a writing tool and being movable perpendicularly to feed direction of said recording paper;
   a carriage drive device for driving said carriage;
   a writing tool drive device for driving said writing tool towards said recording paper;
   a character pattern generator for generating character patterns;
   a control device for reading out corresponding character patterns from said character pattern generator on basis of record data and driving said carriage drive device and said writing tool drive device, in response to said character patter, thereby to control said paper feed device;
   change means for changing lateral direction of recording and longitudinal direction of recording; and
   means for mutually changing drive signals to be supplied from said control device to said paper feed device and to said carriage drive device, respectively, on the basis of said change means.

2. The apparatus of claim 1, wherein said paper feed device comprises a drive motor rotatable in forward and reverse directions, a platen with a circular cross-section and being rotatably supported, and means for transmitting the rotation of said drive motor in forward and reverse directions to said platen.

3. The apparatus of claim 2, wherein said carriage supports a ball point pen as said writing tool.

4. A recording apparatus with a keyboard, comprising
   a keyboard having character keys, symbol keys, and a plurality of function keys;
   a paper feed device for feeding a recording paper, supported on a paper support device, in forward and reverse directions;
   a carriage for supporting a writing tool and being movable perpendicularly to said feed direction of said paper;
   a carriage drive device for driving said carriage;
   a writing tool drive device for contacting said writing tool to said recording paper;
   a character pattern memory for storing character pattern data;
   a control device for reading out corresponding character pattern data from said character pattern memory on basis of operation of said character keys and symbol keys and driving said carriage device and said writing tool drive device in response to said character pattern data thereby to control said paper feed device; and
   change means for mutually changing drive signals to be supplied from said control device to said paper feed device and said carriage drive device, respectively,
   wherein said keyboard has special keys installed therein for commanding whether character or symbol is recorded in a longitudinal direction or a lateral direction with respect to said recording paper, so that data inputted from said keyboard is recorded in a direction corresponding to selection of said special keys.

5. The apparatus of claim 4, wherein said paper feed device comprises a motor rotatable in forward and reverse directions, a platen with circular cross section being rotatably supported, and means for transmitting rotation of said drive motor in forward and reverse directions to said platen.

6. The apparatus of claim 5, wherein said carriage supports a ball point pen as said writing tool.

7. The apparatus of claim 6, wherein said keyboard has an indicator for indicating operation of said special keys.

* * * * *